United States Patent
Draisey

(10) Patent No.: US 6,755,010 B2
(45) Date of Patent: Jun. 29, 2004

(54) CAPSULES

(75) Inventor: Allan Draisey, Felpham (GB)

(73) Assignee: Stanelco Fibre Optics LTD, Fareham (GB)

( * ) Notice: Subject to any disclaimer, the term of this patent is extended or adjusted under 35 U.S.C. 154(b) by 0 days.

(21) Appl. No.: 10/220,805

(22) PCT Filed: Mar. 15, 2001

(86) PCT No.: PCT/GB01/01126

§ 371 (c)(1),
(2), (4) Date: Sep. 6, 2002

(87) PCT Pub. No.: WO01/68032

PCT Pub. Date: Sep. 20, 2001

(65) Prior Publication Data

US 2003/0021839 A1 Jan. 30, 2003

(30) Foreign Application Priority Data

Mar. 17, 2000 (GB) .............................................. 0006430

(51) Int. Cl.$^7$ .............................................. B65B 47/02
(52) U.S. Cl. ............................. 53/454; 53/479; 53/460; 53/452; 53/574; 53/374.3
(58) Field of Search .......................... 53/454, 479, 560, 53/452, 574, 374.3, 374.4, 374.5; 425/116; 424/461; 156/243

(56) References Cited

U.S. PATENT DOCUMENTS

| | | | | |
|---|---|---|---|---|
| 4,154,636 A | * | 5/1979 | Motoyama et al. | 156/243 |
| 4,820,364 A | * | 4/1989 | Graham | 156/69 |
| 5,146,730 A | * | 9/1992 | Sadek et al. | 53/454 |
| 5,342,626 A | * | 8/1994 | Winston et al. | 424/461 |
| 5,427,645 A | * | 6/1995 | Lovin | 156/367 |
| 6,295,793 B1 | * | 10/2001 | Takayanagi | 53/454 |
| 6,402,496 B2 | * | 6/2002 | Ishikawa et al. | 425/116 |
| 6,591,585 B2 | * | 7/2003 | Stolz | 53/454 |

* cited by examiner

Primary Examiner—Stephen F. Gerrity
Assistant Examiner—Hemant M Desai
(74) Attorney, Agent, or Firm—William H. Holt

(57) ABSTRACT

Capsules, for example for the delivery of pharmaceuticals, are produced from two films (18) of a water-soluble polymeric material, by deforming the films to form a multiplicity of recesses, and filling the recesses with a flowable filling material. This is performed using two adjacent rotary dies (14, 15), with recesses (16) into which the films (18) are deformed. The dies (14, 15) also act as electrodes for welding the films together by dielectric welding to form filled capsules (30). The capsules (30) can readily be separated from the resulting web. The polymeric material may be gelatin, or a water-soluble cellulose derivative such as hydroxypropyl methyl cellulose, and may also contain a plasticizer.

11 Claims, 1 Drawing Sheet

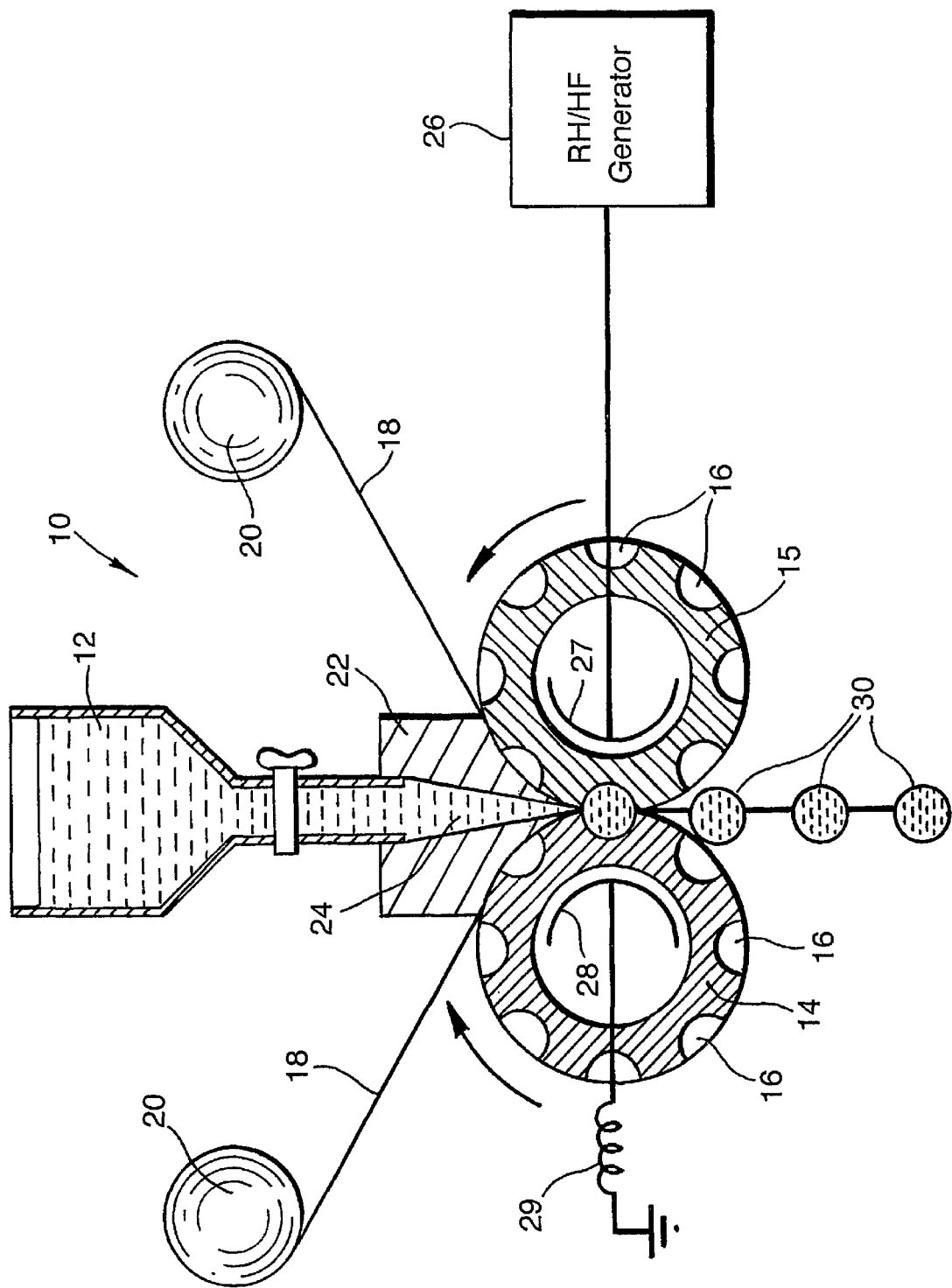

CAPSULES

This invention relates to a process and an apparatus for forming capsules, for example for the delivery of pharmaceuticals, and also to the resulting capsules.

A variety of pharmaceuticals and other materials are delivered in capsules. Where the material is a particulate material such as a powder it may be enclosed in a hard capsule, typically of elongated round-ended cylindrical shape, made in two pieces for assembly around the material. Both liquid and particulate material may be enclosed in soft capsules, these capsules being made from films of a soft elastic polymer which are brought together between rotating dies that have cavities in their surfaces. The material to fill the capsules is supplied between the films as the films deform into the cavities; as the dies move the films come together and are sealed together by application of heat and/or pressure at the dies. Both types of capsules are commonly made from gelatin films. The bonding of thermoplastic polymer films using dielectric heating (or radio frequency heating) has also been known for many years. In this process the two pieces of thermoplastic material are positioned between opposed electrodes (or one electrode and a base plate), the electrodes are pressed together, and a radio frequency voltage is applied between the electrodes. This process is however applicable only to those materials which have a significant dielectric loss index, for example greater than 0.2, over the range say 20–60 MHz, for example polyvinylchloride. Dielectric welding has not hitherto been considered suitable for welding the water-soluble polymers which are desirably used in making capsules for pharmaceuticals.

According to the present invention there is provided a process for making capsules, the process using two films of a water-soluble or digestible polymeric material, and the process comprising the steps of deforming the films to form a multiplicity of recesses between a pair of rotary dies, filling the recesses with a flowable filling material, welding the films together by dielectric welding at the rotary dies to form a multiplicity of enclosures containing the filling material, and separating the filled enclosures from the remaining parts of the films so as to form a multiplicity of capsules.

The rotary dies act as opposed electrodes, to which the high frequency electrical supply is provided. The supply may in principle be at a frequency between 1 MHz and 200 MHz, usually between 10 MHz and 100 MHz, but stringent limits are imposed on any emitted radio waves. In practice therefore the choice of frequency may be more limited. For example the supply frequency may be 27.12 MHz, or 40.68 MHz. Preferably the electrical connections to both the rotary dies are by a capacitative coupling. Alternatively the coupling may be by a sliding contact, for example with brushes. A tuned circuit may be electrically connected to at least one of the electrodes, for example the tuned circuit may be connected between one electrode and ground potential. For example a tuned circuit may comprise an inductor connected to the capacitative coupling to one electrode and to ground potential, the tuned circuit preferably resonating at a frequency substantially that of the supply. The tuned circuit may be a matching network.

Each rotary die may be substantially cylindrical, and rotate about a fixed axis of rotation. Alternatively each rotary die may be of substantially polygonal cross-section, for example octagonal, the axes of rotation being sprung loaded towards each other. The dies may be arranged to form one capsule at a time, forming the multiplicity of recesses in succession as the dies rotate. Alternatively the dies may be arranged to form a plurality of capsules at once, side-by-side across the width of the films. A heater may be associated with the rotary dies, to provide heating of the films to soften them, before they are deformed to form the recesses. The films may be deformed by suction into matching recesses in the dies. The cutting out of the capsules may be performed by punching, but alternatively the dies may be sufficiently close together, at least around the periphery of each recess, that the film surrounding each capsule is sufficiently thin that the capsules can be easily pushed out of the remaining web; for example around the periphery of each capsule the film might be of a thickness between 10 and 20 $\mu$m.

The filling material may be a pharmaceutical, and is a preferably a liquid. Where the capsules are intended to be swallowed (for example where they contain a pharmaceutical or a nutritional supplement), the polymeric material should be ingestible. It may for example be gelatin, or a water-soluble cellulose derivative. For example it may be hydroxypropyl methyl cellulose, which is approved for use with pharmaceuticals and in food (being indicated by the code E464 in Europe). Other suitable polymeric materials would be edible seaweed-derived polymers such as sodium alginate (E401), propylene glycol alginate (E405) or agar— agar (E406). The polymeric material must not contain any harmful or toxic additives, but may contain compounds such as glycerol (E422) or glycerol monostearate (E471) as plasticisers, these compounds also being ingestible and dispersible or soluble in water. Other suitable cellulose derivatives are hydroxypropyl cellulose (E463), and methyl ethyl cellulose (E465). There is no requirement for any water to be added to the film, and indeed it is preferable that the films should be at least superficially dry, that is to say in equilibrium with ambient conditions. For example the film might be in equilibrium with air at a temperature of 25° C. and a relative humidity of 40%. For example, it might be stored before use in a controlled humidity environment, with a relative humidity preferably in the range 30% to 70%. Under such circumstances the film would evidently incorporate some water but would appear completely dry, and such incorporated water would tend to act as a plasticiser.

The invention also provides an apparatus for making and filling capsules by the method specified above, comprising rotary dies arranged to deform the film and to dielectrically weld them together. In a further aspect, the invention provides a capsule formed by the method or apparatus of the invention.

The invention will now be further and more particularly described, by way of example only, and with reference to the accompanying drawing which shows a side view, partly in section, of an apparatus for forming capsules.

Referring to FIG. 1 this shows schematically an apparatus 10 for making capsules of an ingestible, pharmaceutical grade material, such as hydroxypropyl methyl cellulose, the capsules being filled with a non-aqueous liquid filling material 12. The apparatus comprises two adjacent rotary dies 14 and 15, each of generally cylindrical external shape, which define a plurality of oval recesses 16 in their periphery (eight recesses, as shown, along a peripheral path), the rotations of the dies 14 and 15 being synchronized so that the recesses 16 are always opposite each other. Heaters (not shown) are arranged to maintain the dies 14 and 15 at a temperature between 50 and 70° C., for example 60° C. Two sheets 18 of the polymeric material (hydroxypropyl methyl cellulose containing glycerol ester as a plasticiser in this example) are supplied to the dies 14 and 15 from rollers 20, each sheet 18 being of uniform thickness 0.20 mm. The dies 14 and 15 are of the same length as the width of the films 18, and may have other sets of recesses spaced axially along their length, for example six. The dies 14 and 15 are hollow, defining within them narrow ducts (not shown) communicating with the base of each recess 16, and valves (not shown) whereby suction can be applied to those recesses 16 that are immediately above the pinch between the dies 14 and 15. The axes of rotation of the dies 14 and 15 are spring loaded towards each other, so the films 18 are subjected to compression as they pass between the dies 14 and 15, and are arranged so that, at their closest, the dies are 12 $\mu$m apart immediately around each recess 16.

Immediately above the two dies 14 and 15 is a non-conductive guide block 22, the films 18 passing between the lower curved surface of the guide block 22 and the outer surface of the dies 14 and 15. The filling material 12 is fed through ducts 24 in the guide block 22 into the gap between the films 18 just above the point where they come together, each duct 24 being aligned with one of the sets of peripheral recesses 16. The films 18 are softened by their contact with the heated surface of the dies 14 or 15, and are deformed by being sucked into the recesses 16 above the pinch point. Hence the filling material 12 fills the recesses 16 at this point.

A high frequency generator 26 is connected via a capacitative coupling 27 to the die 15, this generating an electrical current at a frequency of 27.12 MHz. The other die 14 is connected via another capacitative coupling 28 and an inductor 29 to earth potential. The capacitative coupling 28 and the inductor 29 together form a tuned circuit that has a resonant frequency at which its impedance is a minimum, the value of the inductor being selected so the resonant frequency is at (or close to) the frequency of the generator 26. In operation of the apparatus 10 the generator 26 continuously supplies this high frequency signal, so that as the films 18 pass between the dies 14 and 15 they are subjected to dielectric welding. The opposed faces of the sheets 18 become hot enough to fuse together, whereas the outer faces in contact with the dies remain at the temperature of the dies 14 and 15. Thus in operation an array of filled capsules 30, each sealed and connected together by a web of welded sheet 18, emerges from below the rotary dies 14 and 15. The web is only 12 $\mu$m thick around the periphery of each capsule 30, so that the capsules 30 can readily be separated from the remainder of the web.

Because the polymeric material melts during the welding process, a bead of molten material forms around the the welded seam on the inside of each capsule 30, so that after the capsules have been cut out the wall thickness is slightly thicker around the seam. The sealed nature of the capsules 30 allows the material 12 to be liquid, so that a wide range of pharmaceuticals can be delivered with such a capsule 30. By way of example each capsule 30 might be of ellipsoidal shape, 10 mm long and 7 mm wide. The use of a cellulose derivative (such as hydroxypropyl methyl cellulose) for the sheets 18, and so for the walls of the capsule, has advantages in view of the proven use of such material for pharmaceutical applications, and in view of its solubility in water and its lack of toxic effects.

The solubility of the capsule walls means that the capsules will break down quickly in a patient's stomach, giving rise to a fast release of the pharmaceutical. For some applications the speed of release may be excessively fast. In that case, or for aesthetic reasons or reasons of taste and handling, the capsules might be embedded in additional material such as a sugar coating for improved taste, or a less soluble coating to slow down release.

It is apparent from the description of the welding arrangements, that direct contact is made between the dies 14 and 15 and the sheets 18 of material being welded. Barrier sheets commonly used in dielectric welding are not required or used. This increases the acceptability of the process for pharmaceutical use, in avoiding the use of a potential source of contamination, particularly in view of the fibrous nature of common barrier materials. A particular advantage of the present invention is that the capsules 30 can be filled with liquid. The liquid may be a solution of a pharmaceutically active material, or a medicine in liquid form, or an emulsion of pharmaceutical material in a liquid, or a pharmaceutically active oil or other liquid. It will be readily understood that the filling material 12 must be compatible with the material of the sheet 18 and in particular that water and aqueous solutions are not desirable in view of the highly soluble nature of the cellulose derivative. The filling material might alternatively be a free-flowing powder, for example.

Many variations and modifications may be made to the apparatus described above without departing from the scope of the present invention. For example three sheets might be welded together in a single operation, with recesses in the outer sheets, so that a two-compartment capsule could be produced in which each compartment held a different material. Pharmaceutical grade cellulose derivatives are highly preferred, but other materials such as gelatin may be used. In any event the presence of a plasticiser in the polymer film is beneficial to both the formation of the recesses and the welding process. The rotary dies may compress the films down to a thickness of say 0.3 mm over the entire weld area, so that in the welding process molten polymer will tend to flow so as to create a bead of molten material around the welded seam at the edge of each recess. The rotary dies might incorporate a punch mechanism to separate the capsules 30 from the web, rather than merely forming a thin portion of web around each capsule 30.

What is claimed is:

1. A process for making capsules from films of polymeric material, the process comprising the steps of deforming the films to form a multiplicity of recesses, filling the recesses with a flowable filling material, welding the films together to form a multiplicity of enclosures containing the filling material, and separating the filled enclosures from the remaining parts of the films so as to form the said multiplicity of capsules, wherein the welding process is dielectric welding performed between a pair of rotary dies, and characterized in that the process uses films of a water-soluble or digestible polymeric material.

2. A process as claimed in claim 1 wherein the dielectric welding step involves applying electrical signals to the rotary dies by use of capacitative couplings.

3. A process as claimed in claim 1 wherein the electrical connection to at least one rotary die incorporates a tuned circuit.

4. A process as claimed in claim 2 wherein the electrical connection to at least one rotary die incorporates a tuned circuit.

5. A process as claimed in claim 1 wherein each film comprises a water-soluble cellulose derivative.

6. A process as claimed in claim 4 wherein each film comprises a water-soluble or digestible plasticiser.

7. A process as claimed in claim 1 wherein each film is dry, being in substantial equilibrium with ambient atmosphere containing humidity.

8. A process as claimed in claim 6 wherein each film is dry, being in substantial equilibrium with ambient atmosphere containing humidity.

9. A process as claimed in claim 1 wherein the films are heated to above ambient temperature before being deformed to form the recesses.

10. A process as claimed in claim 1 wherein the dies are sufficiently close together during the welding process, at least around the periphery of each recess, that after welding the film surrounding each capsule is sufficiently thin that the capsules can be easily separated from the remaining web.

11. A process as claimed in claim 1 wherein the step of welding the films together is performed with direct contact being made between said dies and said films without use of barrier sheets between said dies and said films being welded.

* * * * *